US009131183B2

(12) United States Patent
Miyoshi et al.

(10) Patent No.: US 9,131,183 B2
(45) Date of Patent: Sep. 8, 2015

(54) IMAGE SIGNAL PROCESSING APPARATUS, IMAGE SCANNING APPARATUS AND METHOD FOR PROCESSING IMAGE SIGNAL, EMPLOYING SPREAD SPECTRUM MODULATED CLOCK SIGNAL

(75) Inventors: Yuuya Miyoshi, Osaka (JP); Tohru Kanno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 13/822,081

(22) PCT Filed: Sep. 8, 2011

(86) PCT No.: PCT/JP2011/071062
§ 371 (c)(1),
(2), (4) Date: Mar. 11, 2013

(87) PCT Pub. No.: WO2012/036227
PCT Pub. Date: Mar. 22, 2012

(65) Prior Publication Data
US 2013/0162870 A1    Jun. 27, 2013

(30) Foreign Application Priority Data

Sep. 15, 2010 (JP) .................................. 2010-206946

(51) Int. Cl.
*H04N 1/409* (2006.01)
*H04N 1/40* (2006.01)
(Continued)

(52) U.S. Cl.
CPC ........... *H04N 1/409* (2013.01); *H04N 1/40056* (2013.01); *H04N 5/217* (2013.01); *H04N 5/3577* (2013.01); *H04N 5/3765* (2013.01)

(58) Field of Classification Search
CPC ..... H04N 5/3577; H04N 1/409; H04N 5/217; H04N 5/3765; H04N 1/40056

USPC ............ 348/207.99, 241, 250, 294, 311, 312; 358/1.1, 1.9, 1.15, 3.26, 409–424, 463, 358/474, 483, 513; 375/130, 141; 382/325
See application file for complete search history.

(56) References Cited

U.S. PATENT DOCUMENTS 8,160,117 B1 *   4/2012   Courcy ..................... 375/130
2004/0013321 A1 *   1/2004   Ohkawa ..................... 382/325
(Continued)

FOREIGN PATENT DOCUMENTS

| EP | 2150041 A2 | 2/2010 |
|---|---|---|
| JP | 2008-118366 | 5/2008 |
| JP | 2010-057159 | 3/2010 |

OTHER PUBLICATIONS

European search report dated Oct. 9, 2013 in corresponding European patent application No. 11 82 5227.9.

(Continued)

*Primary Examiner* — Dennis Hogue
(74) *Attorney, Agent, or Firm* — Cooper & Dunham LLP

(57) ABSTRACT

A signal processing circuit 4 includes a clock circuit 24 which generates a clock signal which has been subjected to spread spectrum modulation and supplies the clock signal to a photoelectric conversion element; a AD converter 15 which performs AD conversion on an image signal obtained by the photoelectric conversion element; a noise detecting circuit 21 which detects a noise amplitude of a noise signal that is caused by the spread spectrum modulation of the clock signal and is included in the image signal which has been AD converted; and an analog correction circuit 23 and an digital correction circuit 22 that calculate a correction factor based on the noise amplitude, generate a correction signal by multiplying the digital modulation signal by the correction factor, and superimpose the correction signal onto the image signal at an input side or an output side of the AD converter.

14 Claims, 12 Drawing Sheets

(51) Int. Cl.
*H04N 5/217* (2011.01)
*H04N 5/376* (2011.01)
*H04N 5/357* (2011.01)

(56) References Cited

U.S. PATENT DOCUMENTS

| 2004/0136440 A1* | 7/2004 | Miyata et al. ................ 375/130 |
| 2006/0176201 A1 | 8/2006 | Kimura et al. |
| 2008/0106748 A1 | 5/2008 | Tsukahara et al. |
| 2009/0059324 A1 | 3/2009 | Nagase et al. |
| 2010/0027061 A1* | 2/2010 | Nakazawa ................... 358/1.15 |
| 2010/0177364 A1* | 7/2010 | Yoshigae ..................... 358/483 |
| 2010/0231979 A1* | 9/2010 | Nagase et al. ............... 358/3.26 |
| 2011/0019718 A1* | 1/2011 | Chiang et al. ................ 375/141 |

OTHER PUBLICATIONS

International Search Report Issued Oct. 11, 2011 in PCT/JP2011/071062 filed on Sep. 8, 2011.

* cited by examiner

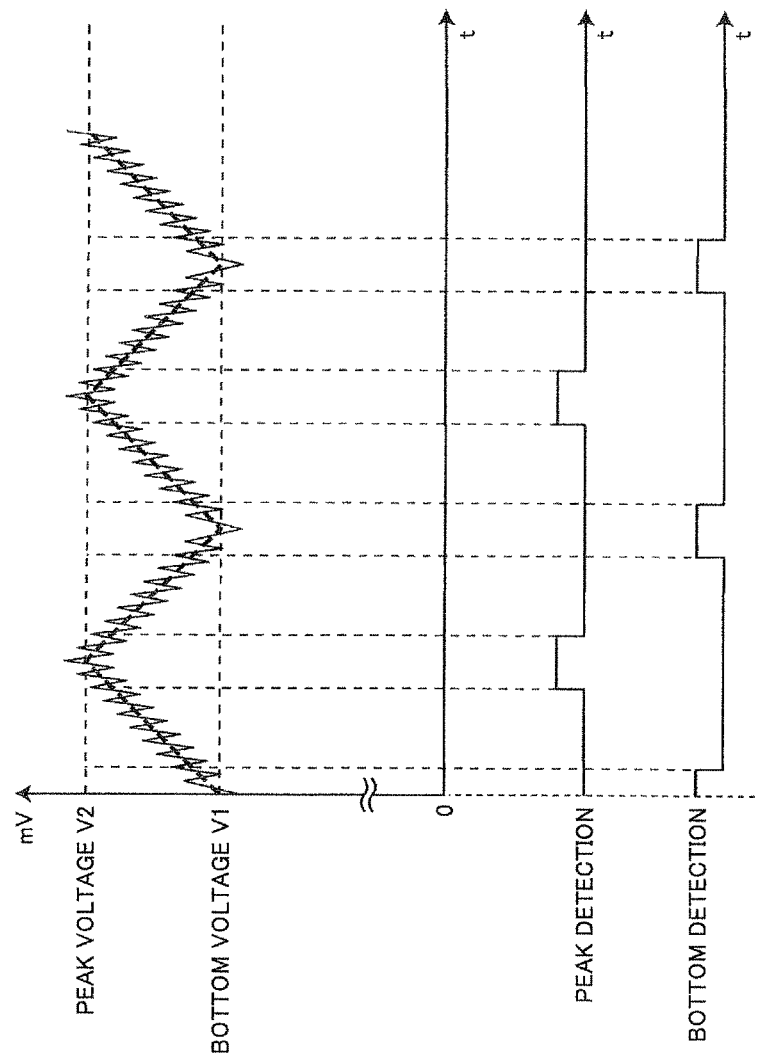

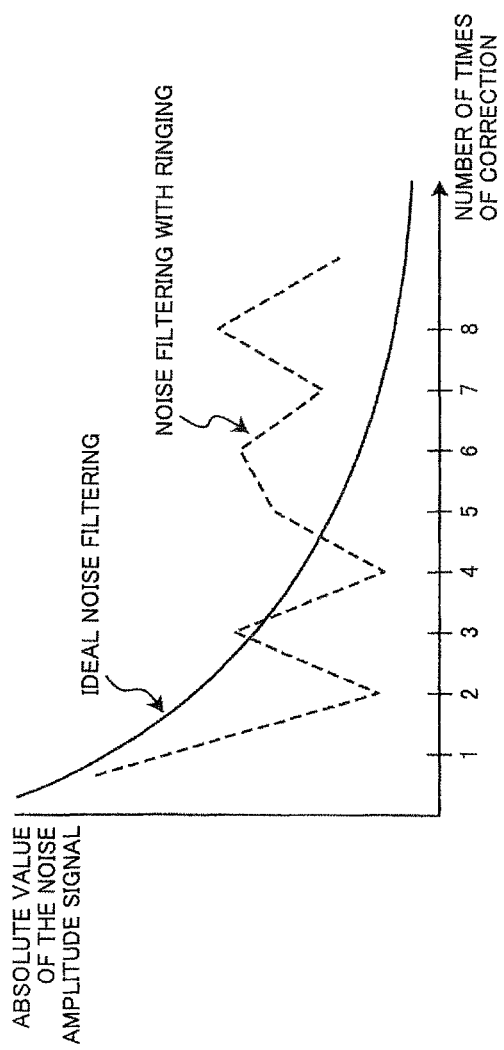

IMAGE SIGNAL PROCESSING APPARATUS, IMAGE SCANNING APPARATUS AND METHOD FOR PROCESSING IMAGE SIGNAL, EMPLOYING SPREAD SPECTRUM MODULATED CLOCK SIGNAL

TECHNICAL FIELD

The present invention generally relates to an image signal processing apparatus and a method for processing an image signal that filter out noise generated by fluctuation of a clock signal. The noise is included in an image signal obtained by a CCD or the like which operates based on the clock signal that has been subjected to spread spectrum modulation. The present invention further relates to an image scanning apparatus which includes the image signal processing apparatus.

2. Background Art

Conventional image scanning apparatuses have a problem in that EMI (Electromagnetic Interference) which has a peak at a specific frequency is caused by a clock signal that is provided into a photoelectric conversion element such as CCD or the like. A spread spectrum clock generator (SSCG) has been used in order to solve the problem. The SSCG disperses the energy of the EMI which has the peak at the specific frequency and reduces the peak level of the EMI by modulating (using a spread spectrum) the frequency of the clock signal slightly.

However, there is a problem in that spread spectrum noise is mixed into the image signal obtained by the CCD when the clock signal is generated by the SSCG. The spread spectrum noise has the same cycle as that of a modulation signal of the spread spectrum and is a triangle wave noise which is in-phase or reverse-phase with the image signal. In order to further solve the problem, Japanese Patent Laid-Open Publication No. 2008-118366 discloses a method for inputting a reverse-phase signal into a signal processing IC which processes an image signal obtained by a CCD via an input side reference terminal of an analog front end of the signal processing IC. Japanese Patent Laid-Open Publication No. 2010-057159 discloses a technique in which a fluctuation amount of the black data of an image signal is fed back to a clamp circuit in an analog front end or an emitter follower circuit which is disposed at an input side of the analog front end.

FIG. 1 shows a block diagram of a conventional image scanning apparatus. FIG. 2 shows a detailed block diagram of a clock circuit shown in FIG. 1. The conventional image scanning apparatus includes an image signal processing apparatus which processes an image signal obtained by a CCD that operates based on a clock signal that has been subjected to spread spectrum modulation. As shown in FIG. 1, an image signal which is obtained by a CCD 101 is transmitted to a signal processing circuit 104 via an emitter follower circuit 102 and a coupling capacitor 103. The signal processing circuit is preferably comprised of an IC. The image signal which is input into the signal processing circuit 104 is amplified and digitally converted through a clamp circuit 111, a sample and hold circuit 112, an analog amplifier 113, an AD (Analog to Digital) converter 114 and a digital amplifier 115, and is output as a digital image signal. The digital image signal which is output from the digital amplifier 115 is transmitted to a noise detecting circuit 121. The conventional image scanning apparatus includes a clock circuit 105 which is disposed outside the IC of the signal processing circuit 104. The clock circuit 105 generates a clock signal and transmits the clock signal to the CCD 101 via a DLL (Delay Locked Loop) circuit 106 and to the signal processing circuit 104. The clock circuit 105 generates a loop filter signal and transmits the loop filter signal to the noise detecting circuit 121. The loop filter signal is used for generating a correction signal which is used for reducing noise. The noise detecting circuit 121 detects spread spectrum noise based on the digital image signal and the loop filter signal. A correction circuit 122 generates the correction signal based on a detection result of the noise detecting circuit 121 and transmits the correction signal to the clamp circuit 111. The clamp circuit 111 superimposes the correction signal onto the original image signal.

As shown in FIG. 2, the clock circuit 105 includes a spread spectrum clock generator 131, a phase comparator 132, a loop filter circuit 133, a voltage controlled oscillator 134 and a divider 135. The phase comparator 132, the loop filter circuit 133, the voltage controlled oscillator 134 and the divider 135 operate as a phase locked loop (PLL) circuit that transmits a signal which is generated by the spread spectrum clock generator 131 to the DLL 106. The signal is transmitted to the DLL 106 as the clock signal. The clock circuit 105 transmits an internal signal of the loop filter circuit 133 to the noise detecting circuit 121 as a loop filter signal which is used for generating the correction signal. The correction signal is used for reducing the noise. The internal signal is an input signal of the voltage controlled oscillator 134 in the phase locked loop circuit.

However, according to the techniques shown in FIGS. 1 and 2, there are problems as described below.

It is difficult to control the phase of the loop filter signal. The loop filter signal is transmitted from the clock circuit 105 which is disposed outside the signal processing circuit 104 to the signal processing circuit 104 in order to generate the correction signal for reducing the noise.

The loop filter signal is susceptible to the noise, since the amplitude of the loop filter signal is relatively small.

The amplitude which can be detected may fluctuate in a case where sensitivity of the voltage controlled oscillator 134 (or the phase locked loop circuit) may be varied.

SUMMARY OF THE INVENTION

It is a general object of the present invention to provide an image signal processing apparatus and a method for processing an image signal that can filter out the noise which is generated by the fluctuation of the clock signal more effectively than the conventional image signal processing apparatuses. The noise is included in the image signal obtained by CCD or the like which operates based on the clock signal that has been subjected to spread spectrum modulation.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image signal processing apparatus, an image scanning apparatus and a method for processing image signal particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image signal processing apparatus including: a clock generator configured to generate a clock signal which has been subjected to spread spectrum modulation by using a digital modulation signal and to supply the clock signal to a photoelectric conversion element; an AD converter configured to perform AD conversion on an image signal which is obtained by the photoelectric conversion element; a noise detector configured to detect a noise amplitude of a noise signal which is caused by the spread spectrum modulation of the clock signal and is included in the image signal that has been AD converted; and a correction circuit configured to calculate a correction factor based on the noise amplitude, to generate a correction signal by multiplying the digital modulation signal by the correction factor, and to superimpose the correction signal onto the image signal at an input side or an output side of the AD converter.

Another embodiment of the present invention provides an image scanning apparatus including: the image signal processing apparatus.

Another embodiment of the present invention provides a method for processing an image signal comprising: a step for generating a clock signal which has been subjected to spread spectrum modulation by using a digital modulation signal and supplying the clock signal to a photoelectric conversion element; a step for performing AD conversion on an image signal which is obtained by the photoelectric conversion element; a noise detection step for detecting a noise amplitude of a noise signal which is caused by the spread spectrum modulation of the clock signal and is included in the image signal that has been AD converted; and a correction step for calculating a correction factor based on the noise amplitude, generating a correction signal by multiplying the digital modulation signal by the correction factor, and superimposing the correction signal onto the image signal at an input side or an output side of the AD converter.

Other objects, features and advantages of the present invention will become more apparent from the following detailed description when read in conjunction with the accompanying drawings.

BRIEF DESCRIPTION OF THE DRAWINGS

FIG. 11 is a timing chart showing noise of an image signal output from the digital amplifier 17 shown in FIG. 3 and operation of the noise detecting circuit 21; and FIG. 12 is a graph showing filtered noise a ringing.

DESCRIPTION OF EMBODIMENTS

In the following, embodiments of the present invention will be described with reference to the accompanying drawings.

Figure 1:
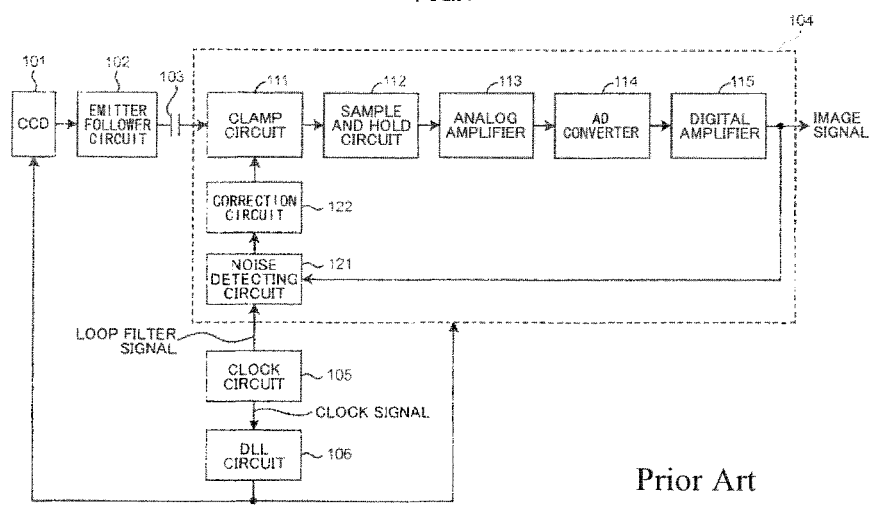
FIG. 1 shows a block diagram of a conventional image scanning apparatus.
Figure 2:
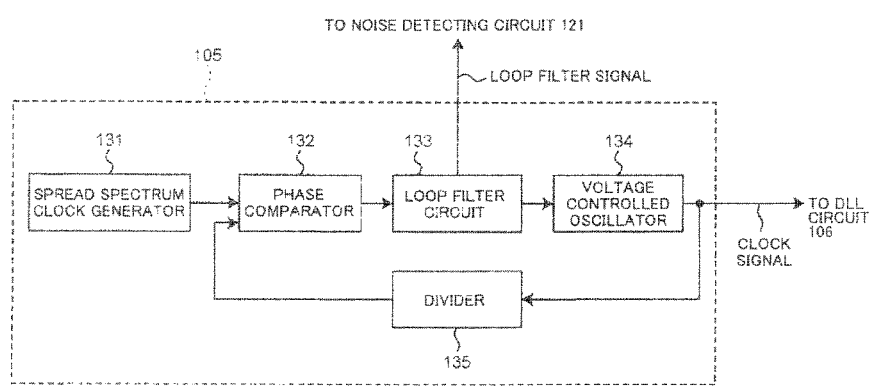
FIG. 2 shows a detailed block diagram of a clock circuit shown in FIG. 1.
Figure 3:
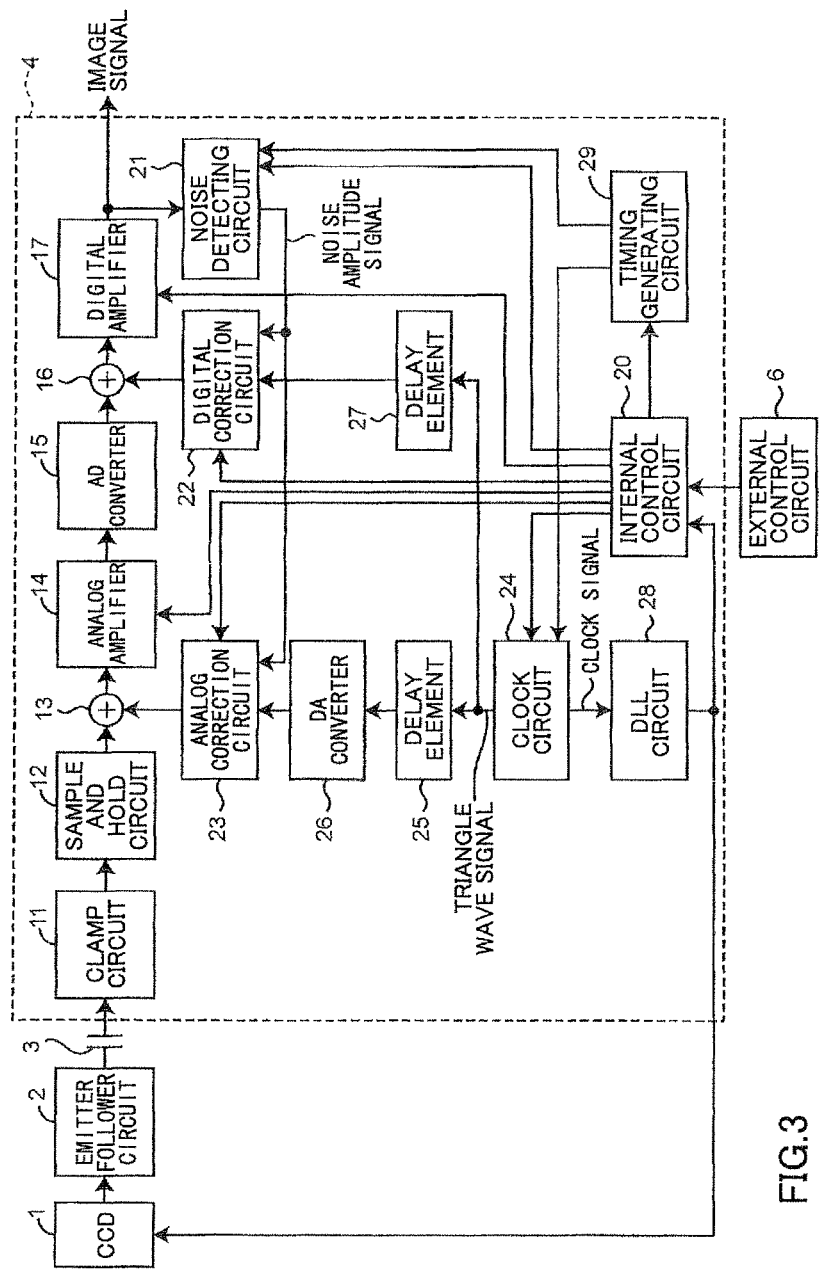
FIG. 3 is a block diagram showing a configuration of an image scanning apparatus according to an embodiment of the present invention.
Figure 4:
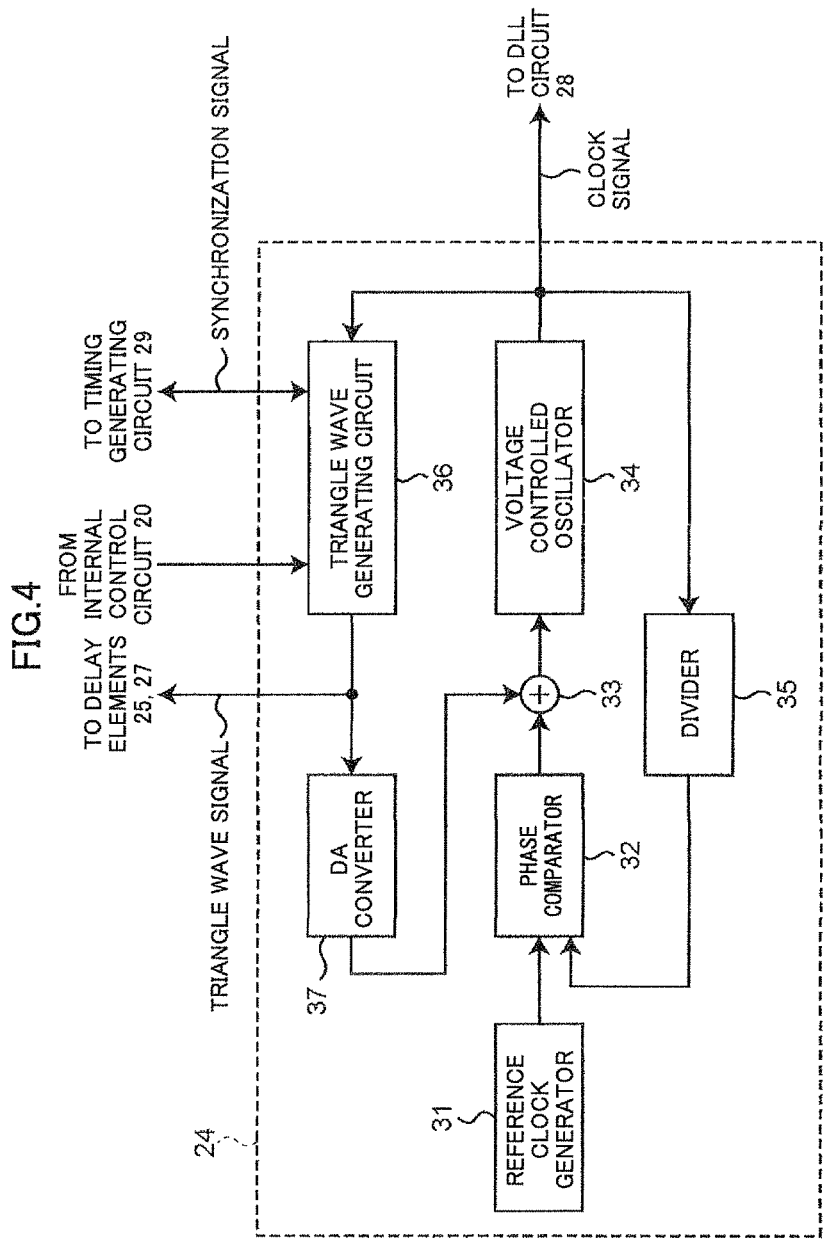
FIG. 4 is a block diagram showing a detailed configuration of a clock circuit 24.

FIG. 3 is a block diagram showing a configuration of an image scanning apparatus according to an embodiment of the present invention. FIG. 4 is a block diagram showing a detailed configuration of a clock circuit 24.

The image scanning apparatus of the present embodiment includes a signal processing circuit 4 which filters out noise (spread spectrum noise) generated by fluctuation of a clock signal. The noise is included in an image signal obtained by a CCD 1 which operates based on a clock signal that has been subjected to spread spectrum modulation. The image scanning apparatus of the present embodiment can reduce the peak level of the EMI which has the peak at a specific frequency by dispersing the energy of the EMI in a similar manner to the conventional image scanning apparatus which includes the SSCG. The image scanning apparatus of the present embodiment can further filter out the spread spectrum noise.

As shown in FIG. 3, the image signal obtained by the CCD 1 is transmitted to the signal processing circuit 4 via an emitter follower circuit 2 and a coupling capacitor 3. The signal processing circuit 4 is comprised of an IC. The image signal which is input into the signal processing circuit 4 is amplified and digitally converted through a clamp circuit 11, a sample and hold circuit 12, a combiner 13, an analog amplifier 14, an AD converter 15, a combiner 16, and a digital amplifier 17, and is output as a digital image signal.

The digital image signal which is output from the digital amplifier 17 is further transmitted to a noise detecting circuit 21. The noise detecting circuit 21 detects a noise amplitude by detecting a peak voltage and a bottom voltage of the noise. The noise is generated by fluctuation of a clock signal and is included in the image signal obtained by the CCD 1. The CCD1 operates based on the clock signal that has been subjected to spread spectrum modulation. The noise amplitude is given as digital data which indicates difference between the peak voltage and the bottom voltage of the spread spectrum noise. The noise detecting circuit 21 transmits a noise amplitude signal which indicates the detected noise amplitude to an analog correction circuit 23 and a digital correction circuit 22. A clock circuit 24 is disposed in the IC of the signal processing circuit 4. The clock circuit 24 generates a clock signal which is subjected to spread spectrum modulation. The clock circuit 24 further generates a triangle wave signal. The triangle wave signal is used for generating the clock signal which is subjected to spread spectrum modulation. The triangle wave signal is a signal which is constituted of digital data and indicates the triangle wave. The triangle wave signal is delayed for a designated period of time by a delay element 25. Then the triangle wave signal is converted into an analog data by a DA (Digital to Analog) converter 26, and transmitted to the analog correction circuit 23. The analog correction circuit 23 generates an analog correction signal based on the noise amplitude signal and the analog triangle wave signal. The details of the analog correction circuit 23 will be described later. The analog triangle wave signal is superimposed onto an original analog image signal (analog data) by the combiner 13. The triangle wave signal is delayed for a designated period of time by a delay element 27, and transmitted to the digital correction circuit 22. The digital correction circuit 22 generates a digital correction signal based on the noise amplitude signal and the digital triangle wave signal. The details of the digital correction circuit 22 will be described later. The digital triangle wave signal is superimposed onto an original digital image signal (digital data) by the combiner 16. The signal processing circuit 4 includes an internal control circuit 20 which controls the whole operation of the signal processing circuit 4. According to the present embodiment, the internal control circuit 20 controls, particularly, the analog amplifier 14, the digital amplifier 17, the noise detecting circuit 21, the digital correction circuit 22, the analog correction circuit 23 and the clock circuit 24. A clock signal which is generated by the clock circuit 5 is transmitted to the CCD 1 and the internal control circuit 20 via a DLL (Delay Locked Loop) circuit 28. The CCD 1 and the internal control circuit 20 use the clock signal for their operations.

The internal control circuit 20 is controlled by an external control circuit 6 which is disposed outside the signal processing circuit 4. The external control circuit 6 is, for example, a circuit which includes a CPU or the like. The CPU controls the whole operation of the image scanning apparatus. A timing generating circuit 29 synchronizes the whole operation of the image scanning apparatus. According to the present embodiment, the timing generating circuit 29 is synchronized with the noise detecting circuit 21 and the clock circuit 24 under the control of the internal control circuit 20.

AS shown in FIG. 4, the clock circuit 24 includes a reference clock generator 31, a phase comparator 32, a combiner 33, a voltage controlled oscillator 34, a divider 35, a triangle wave generating circuit 36 and a DA converter 37. A reference clock which is generated by the reference clock generator 31 is transmitted to the voltage controlled oscillator 34 via the phase comparator 32 and the combiner 33. An output signal of the voltage controlled oscillator 34 is fed back to the phase comparator 32 via the divider 35. The output signal of the voltage controlled oscillator 34 is further transmitted to the triangle wave generating circuit 36. The triangle wave generating circuit 36 is a logic circuit which operates under the control of the internal control circuit 20 and generates a triangle wave signal which is expressed as 8 bit digital data. The triangle wave signal is used for generating the clock signal which is subjected to spread spectrum modulation. The triangle wave generating circuit 36 obtains information of a cycle and amplitude of the triangle wave from the internal control circuit 20 and generates the triangle wave which is synchronized with an operational clock of the voltage controlled oscillator 34. The triangle wave signal expresses a modulation profile of the spread spectrum modulation. The triangle wave signal which is generated by the triangle wave signal generating circuit 36 is converted to an analog data by the DA converter 37. Then the analog triangle wave signal is superimposed onto an output signal of the phase comparator 32 by the combiner 33. The triangle wave signal which is generated by the triangle wave signal generating circuit 36 is further transmitted to the delay elements 25 and 27. The triangle wave signal generating circuit 36 is synchronized with the timing generating circuit 29. Since the image scanning apparatus of the present embodiment includes the configuration as described above, the output signal of the voltage controlled oscillator 34 becomes the clock signal which has been subjected to spread spectrum modulation. The clock circuit 24 transmits the clock signal to the DLL circuit 28.

Since the CCD 1 is controlled by the clock signal which is generated by the clock circuit 24, the image signal which is obtained by the CCD 1 fluctuates in response to the modulation profile of the clock signal and includes the spread spectrum noise. The clock signal has been subjected to spread spectrum modulation by using the triangle wave signal. The modulation profile expresses the triangle wave signal. The image scanning apparatus according to the present embodiment filters out the spread spectrum noise by executing an analog correction process and a digital correction process that use the triangle wave signal.

The delay element 25 among two delay elements 25 and 27 of the signal processing circuit 4 compensates for delay time which occurs in the CCD 1, the emitter follower circuit 2, the coupling capacitor 3, the clamp circuit 11 and the sample and hold circuit 12. Since the delay time described above is not much more than a few clocks, the delay time may be negligible. In this case, the delay element 25 may be omitted. Another delay element 27 compensates for delay time which occurs in the analog amplifier 14 and the AD converter 15 in addition to the delay time which occurs in the CCD 1, the emitter follower circuit 2, the coupling capacitor 3, the clamp circuit 11 and the sample and hold circuit 12. The delay element 27 compensates for delay time ranging from a few clocks to tens of clocks.

Figure 5:
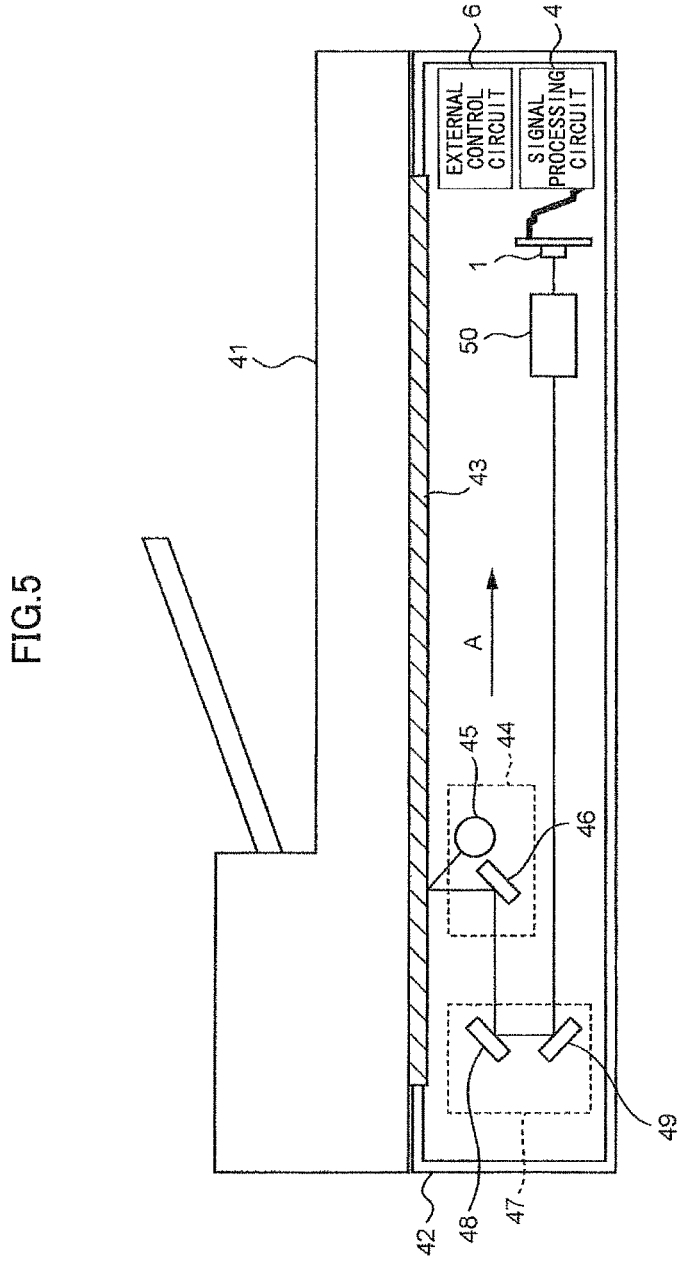
FIG. 5 is a cross-sectional diagram showing a scanner which includes the image scanning apparatus shown in FIG. 3.

FIG. 5 is a cross-sectional diagram showing a scanner which includes the image scanning apparatus shown in FIG. 3. FIG. 5 shows an application example of the image scanning apparatus shown in FIG. 3. A housing 42 of the scanner includes a cover glass 43 on the top surface thereof. A document is mounted onto the cover glass 43. A document cover 41 is disposed onto the cover glass 43. The cover 41 covers the whole surface of the cover glass 43. The cover 41 is openable and closable with regard to the cover glass 43. When the cover 41 is closed, as shown in FIG. 5, light does not enter into the CCD 1 from outside the housing 42. A pressure plate, an ADF (Automatic Document Feeder) or an ARDF (Automatic Reversing Document Feeder) may be used as the cover 41. A first carriage 44 and a second carriage 47 are disposed under the cover glass 43 in a manner where the first carriage 44 and the second carriage 47 can move in the direction of an arrow A. The ratio of the moving speed of the first carriage 44 to the moving speed of the second carriage 47 is 2 to 1. A halogen lamp 45 as a light source and a first mirror 46 are mounted onto the first carriage 44. A second mirror 48 and a third mirror 49 are mounted onto the second carriage 47. The light radiated from the halogen light 45 is reflected by the document. Then the reflected light is reflected by the first mirror 46, the second mirror 48 and the third mirror 49 and enters an imaging lens 50. Then the reflected light is collected by the imaging lens 50 and forms an image onto an imaging plane of the CCD 1. The CCD 1 constitutes a linear image sensor. The image signal which is obtained by the photoelectric conversion of the CCD 1 is transmitted to the signal processing circuit 4 shown in FIG. 3. The image signal is an analog data. For the sake of simplicity, the emitter follower circuit 2, the coupling capacitor 3 or the like is not shown in FIG. 5. The external control circuit 6 controls the whole operation of the scanner.

In the following, the operation of the image scanning apparatus of the present embodiment will be described with reference to FIGS. 6 to 10.

Figure 6:
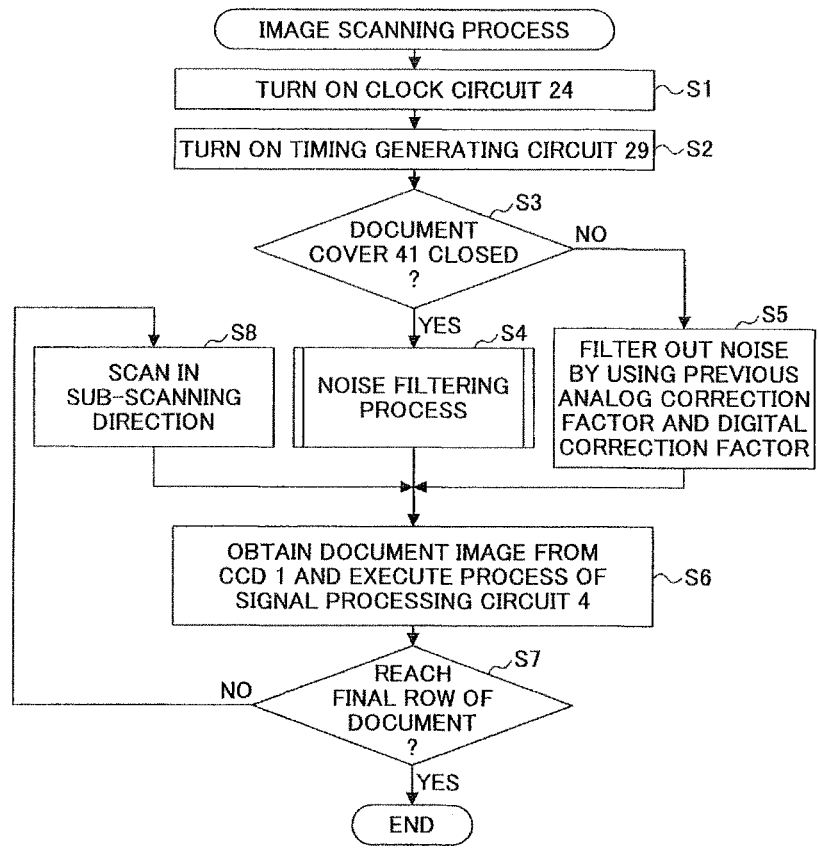
FIG. 6 is a flowchart showing an image scanning process which is executed by the external control circuit 6 shown in FIG. 3.

FIG. 6 is a flowchart showing an image scanning process which is executed by the external control circuit 6 shown in FIG. 3. The external control circuit 6 turns on the clock circuit 24 at step S1, and turns on the timing generating circuit 29 at step S2. The external control circuit 6 determines whether the document cover 41 is closed at step S3. In a case where the document cover 41 is opened and light enters into the CCD 1 from outside the scanner, the spread spectrum noise may not be detected. Thus, the external control circuit 6 executes a calculation of the analog correction factor and the digital correction factor only when the document cover 41 is closed. The external control circuit 6 proceeds to step S4 if step S3 is YES. The external control circuit 6 proceeds to step S5 if step S3 is NO. The external control circuit 6 causes the internal control circuit 20 to execute a noise filtering process at step S4. The contents of the noise filtering process will be described in detail later with reference to FIG. 7. At step S5, the external control circuit 6 causes the internal control circuit 20 to filter out the noise by using the analog correction factor and the digital correction factor of the previous generation, instead of using the analog correction factor and the digital correction factor of the current generation at step S4. At step S5, the internal control circuit 20 filters out the noise by using the analog correction factor which is calculated at step S4 in the previous generation and is stored in the analog correction circuit 23, and the digital correction factor which is calculated by the noise filtering process in the previous generation and is stored in the digital correction circuit 22. The external control circuit 6 proceeds to step S6 after finishing step S4 or S5. At step S6, the external control circuit 6 obtains an image signal of the document from the CCD 1 and executes processes of amplification, AD conversion or the like on the image signal. The signal processing circuit 4 is still continuing noise filtering at step S4 or S5 even when the external control circuit 6 is executing step S6. At step S7, the external control circuit 6 determines whether the first carriage 44 reaches the final row of the document. The external control circuit 6 proceeds to step S8, and scans the document in the sub-scanning direction if step S7 is NO. After finishing step S8, the external control circuit 6 returns the flow to step S6. The external control circuit 6 finishes the flow if step S7 is YES.

Figure 7:
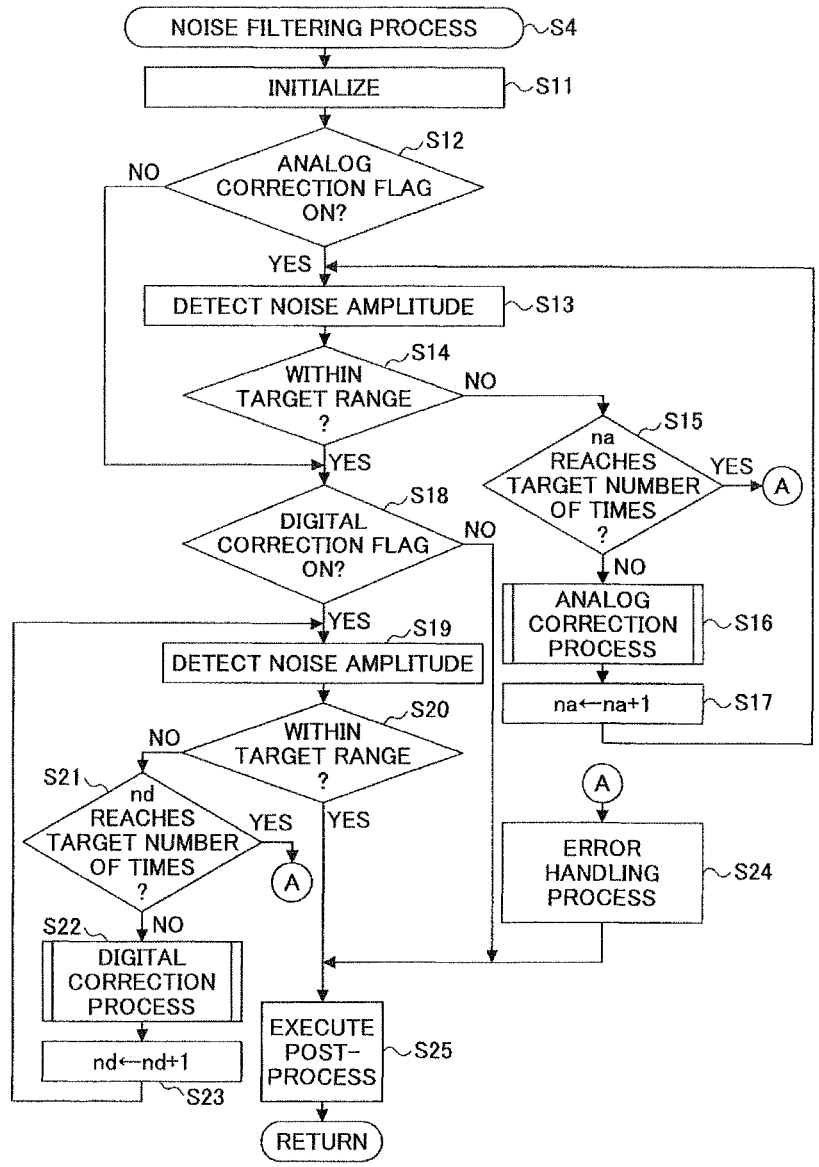
FIG. 7 is a flowchart showing a subroutine of the noise filtering process at step S4.

FIG. 7 is a flowchart showing a subroutine of the noise filtering process at step S4. The external control circuit 6 causes the internal control circuit 20 to execute the noise filtering process at step S4. The internal control circuit 20 initializes parameters that are used at steps described hereinafter. The parameters include items as described below, for example, but are not limited to these items.

1. Turning on an analog correction process flag which indicates whether the analog correction process is to be executed or not.

2. Turning on a digital correction process flag which indicates whether the digital correction process is to be executed or not.

3. Turning on a noise detection flag which indicates whether a noise amplitude detecting process is to be executed or not.

4. Setting a noise detection pattern flag which indicates whether the noise amplitude is detected on single lines of the document or on sets of multi-lines of the document. If the noise amplitude is detected on the sets of the multi-lines of the document, a mean value of the noise amplitude is calculated. The content of the noise detection pattern flag is transmitted to the internal control circuit 20 from the external control circuit 6 based on the condition which is determined by an entry of a user or the like.

5. Initializing a number of times na that the analog correction process has been executed to 0.

6. Initializing a number of times nd that the digital correction process has been executed to 0.

At step S12, the internal control circuit 20 determines whether the analog correction process flag is turned on. The internal control circuit 20 proceeds to step S13, if step S12 is YES. The internal control circuit 20 proceeds to step S18, if step S12 is NO. At step S13, the noise detecting circuit 21 detects the noise amplitude of the spread spectrum noise. The spread spectrum noise is calculated by subtracting the bottom voltage from the peak voltage after detecting the peak voltage and the bottom voltage of the spread spectrum noise. FIG. 11 is a timing chart showing noise of an image signal output from the digital amplifier 17 shown in FIG. 3 and operation of the noise detecting circuit 21. FIG. 12 is a graph showing a noise filtering with ringing. The ringing is caused by the noise filtering. The spread spectrum noise is originally a signal in a shape of a triangle wave which is shown as a bold dashed line in FIG. 11, but is superimposed with additional noise in actuality. The ringing as shown in FIG. 12 occurs based on the additional noise, if a period of time in which the peak voltage and the bottom voltage are detected becomes short, in the noise filtering process. In order to reduce an effect of the additional noise, the peak voltage and the bottom voltage are detected by calculating a mean value of the voltage which is detected for a designated period of time. The designated period of time is set to be one tenth of a cycle of the spread spectrum noise, for example. The spread spectrum noise is shown as the bold dashed line on the upper side of FIG. 11. The noise filtering process is executed repeatedly in order to avoid the occurrence of the ringing. Further, the noise amplitude less than designated amplitude may be negligible. In this case, if a calculation result of subtracting the bottom voltage and the designated amplitude from the peak voltage becomes a negative value, the noise amplitude may be treated as 0.

As shown in FIG. 7, the internal control circuit 20 determines whether the noise amplitude falls within designated target range at step S14. The internal control circuit 20 proceeds to step S18 if step S14 is YES. The internal control circuit 20 proceeds to step S15, if step S14 is NO. At step 15, the internal control circuit 20 determines whether the number of times na of the analog correction process reaches designated target number of times. The internal control circuit 20 proceeds to step S24, if step S15 is YES. The internal control circuit 20 proceeds to step S16, if step S15 is NO. At step S16, the internal control circuit 20 causes the analog correction circuit 23 to execute the analog correction process which will be described later with reference to FIGS. 8 and 9. At step S17, the internal control circuit 20 increments the number of times na of the analog correction process and then returns the flow to step S13.

At step S18, the internal control circuit 20 determines whether the digital correction process flag is turned on. The internal control circuit 20 proceeds to step S19, if step S18 is YES. The internal control circuit 20 proceeds to step S25, if step S18 is NO. At step S19, the noise detecting circuit 21 detects the noise amplitude of the spread spectrum noise. The detection of the noise amplitude is executed in a similar manner to the noise detection at step S13. At step S20, the internal control circuit 20 determines if the noise amplitude falls within designated target range. The internal control circuit 20 proceeds to step S25, if step S20 is YES. The internal control circuit 20 proceeds to step S21, if step S20 is NO. At step S21, the internal control circuit 20 determines whether the number of times nd of the digital correction process reaches a designated target number of times. The internal control circuit 20 proceeds to step S24, if step S21 is YES. The internal control circuit 20 proceeds to step S22, if step S21 is NO. At step S22, the internal control circuit 20 causes the digital correction circuit 22 to execute the digital correction process which will be described later with reference to FIG. 10. At step S23, the internal control circuit 20 increments the number of times nd of the digital correction process, and returns the flow to step S19. The internal control circuit 20 executes an error handling process of step S24 if step S15 or S21 is YES. The error handling process of step S24 is executed in a case where the analog correction process of step S16 or the digital correction process of step S22 fails. The internal control circuit 20 executes a post-process at step S25, and returns to the image scanning process shown in FIG. 6. In the post-process, the internal control circuit 20 executes processes such as turning off flags of the parameters that are initialized at step S11 or the like.

Figure 8:
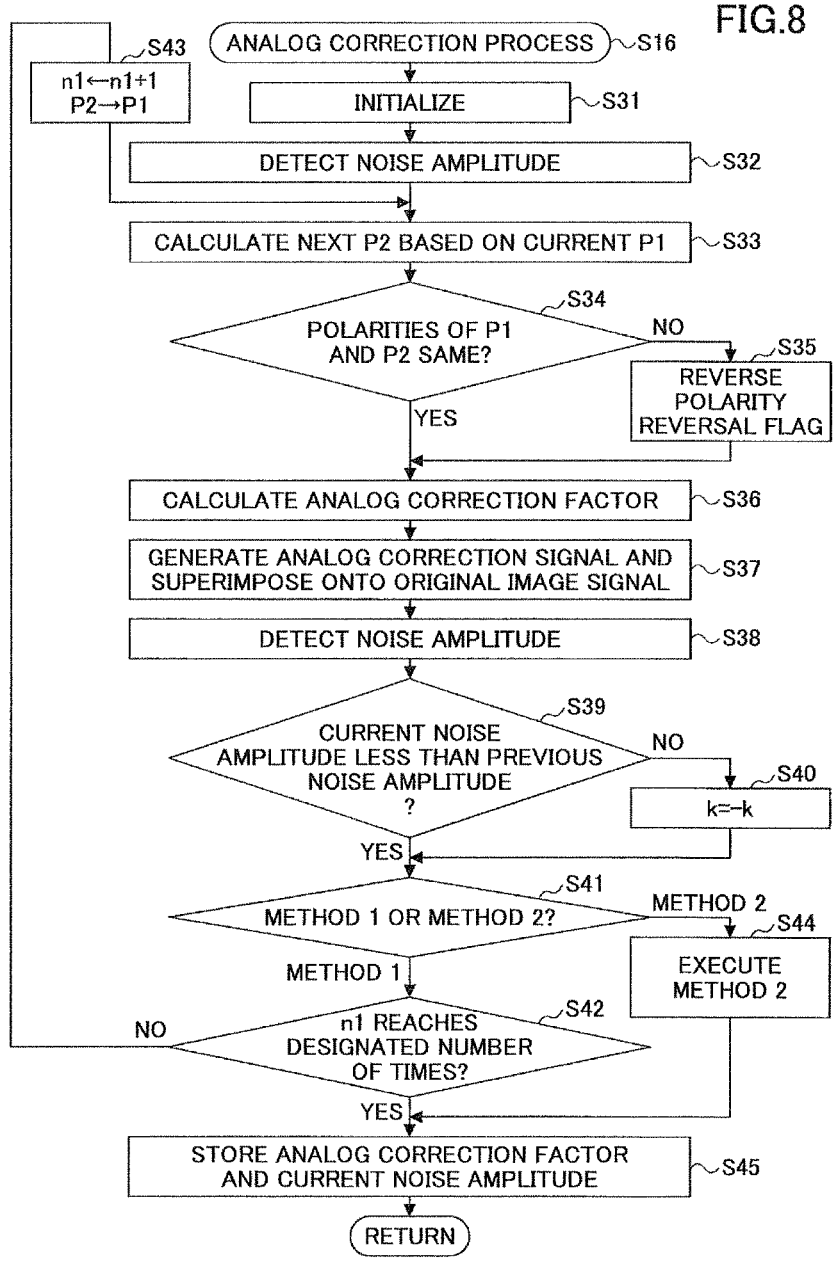
FIG. 8 is a flowchart showing a subroutine of the analog correction process of step S16 as shown in FIG. 7.

FIG. 8 is a flowchart showing a subroutine of the analog correction process of step S16 as shown in FIG. 7. The internal control circuit 20 causes the analog correction circuit 23 to execute the analog correction process of step S16. The analog correction circuit 23 calculates the analog correction factor and determines a polarity reversal flag of the analog correction signal based on the noise amplitude signal. The analog correction circuit 23 generates the analog correction signal by multiplying the analog correction factor, a plus sign or a minus sign of the polarity reversal flag of the analog correction signal and the triangle wave signal (analog data) which has been DA converted. The analog correction circuit 23 uses designated variables in mid-flow of calculating the analog correction factor. The analog correction circuit 23 uses two analog correction methods (method 1 and method 2) in order to calculate the next variable which corresponds to the next analog correction value. According to method 1, the analog correction circuit 23 calculates the next variable based on the current variable and the current noise amplitude. According to method 2, the analog correction circuit 23 calculates the next variable based on the previous variable, the current variable, the previous noise amplitude and the current noise amplitude.

At step S31, the analog correction circuit 23 initializes the parameters that are used in the steps described later. The parameters include items as described below, for example, but are not limited to these items.

11. Setting a parameter att to an arbitrary integer among integers from 0 to 31. The parameter att expresses an attenuation amount which determines the amplitude of the analog correction signal. Value of the parameter att is transmitted to the analog correction circuit 23 from the external control circuit 6 via the internal control circuit 20 based on the condition which is determined by an entry of a user or the like.

12. Setting the polarity reversal flag ainv of the analog correction signal to 0. The polarity reversal flag ainv takes a value of 1 or 0.

13. Initializing variables P1, P2 and P3 that are used in mid-flow of calculation of the analog correction process. Particularly, the current variable P1 is determined by subtracting att from 31, i.e. the current variable P1=31-att.

14. Setting a parameter "Step" which indicates step amplitude of the variables.

15. Setting a factor k to 1. The factor k determines an increase amount or a decrease amount of the variables. The factor k takes value of 1 or −1, i.e. k=1 or k=−1.

16. Setting a parameter fb which determines feed back amount of the noise amplitude.

17. Setting a flag that indicates which method is to be used in the analog correction process among method 1 and method 2 to method 1. The content of the flag is transmitted to the analog correction circuit 23 from the external control circuit 6 via the internal control circuit 20 based on the condition which is determined by an entry of a user or the like.

18. Initializing a number of times n1 to 0. The number of times n1 indicates number of times the loop from steps S33 to S43 is executed.

The parameter "Step" which indicates step amplitude of the variables is calculated by using formula (1).

$$Step = Vta \times Ag \times Dg \times 2^{16} \div Vad \div 31 \qquad (1)$$

Herein, Vta is a voltage of the triangle wave signal which has been DA converted. Vta indicates an amplitude of the triangle wave signal which has been DA converted by the DA converter 26. Vta is calculated by a formula (2), where a parameter amp takes an integer value among integers from 0 to 15. The value of the parameter amp is determined in advance.

$$Vta = 20 \text{ mV}pp \times amp \div 50 \qquad (2)$$

The value of the parameter amp is transmitted to the analog correction circuit 23 from the external control circuit 6 via the internal control circuit 20. Ag is a gain of the analog amplifier 14 and is calculated by a formula (3), where gain code A is a gain code of the analog amplifier 14.

$$Ag = \text{gain code } A \times 3 - 4.5 \text{ dB} \qquad (3)$$

Dg is a gain of the digital amplifier 17 and is calculated by a formula (4), where gain code D is a gain code of the digital amplifier 17.

$$Dg = \text{gain code } D \div 4096 \qquad (4)$$

Vad is a reference voltage of the AD converter 15 and is set to 900 mV, for example. The parameter "Step" indicates by how much step amplitude the variables fluctuate with regard to the parameter att which expresses the attenuation amount.

The parameter fb is calculated by a formula (5), where a parameter trk is determined in advance. The parameter trk takes an integer value among integers from 0 to 3.

$$fb = (trk+1) \div 4 \qquad (5)$$

The parameter fb determines a feed back amount of the noise amplitude. The parameter fb is used for suppressing an oscillation of the image signal which may be caused by a repetition of superimposing a strong signal onto the original image signal for the sake of noise filtering. For example, it is preferable to generate the analog correction signal which does not corrects −5 mV at a time, but corrects 2.5 mV (=5 mV×½) for the first time. The value of the parameter trk can be changed by a user, and is transmitted to the analog correction circuit 23 from the external control circuit 6 via the internal control circuit 20.

A flag which indicates the analog correction method can be changed based on any standard. For example, the user can determine the flag based on the operation and the result of the noise filtering process of the image scanning apparatus. Since the analog correction process of method 2 can be realized by only digital circuits, the noise can be digitally filtered in a stable manner by only using the analog correction process of method 2. But, in fact, the analog correction process is performed by using analog gain. Thus, the noise is affected by a variation of the analog gain. Accordingly, in the initial state, the analog correction method may be set to method 1 for a designated period of time, and then the analog correction method may be changed to method 2.

At step S32, the noise detecting circuit 21 detects the noise amplitude of the spread spectrum noise. The detection of the noise amplitude is performed in a similar manner to the noise detection at step S13. At step S33, the analog correction circuit 23 calculates the next variable P2 based on the current variable P1 by using the formula (6), where Ac is the current noise amplitude.

$$P2 = P1 - k \times fb \times Ac \div Step \qquad (6)$$

In a case where P2>31, the variable P2 is set to 31, i.e. P2=31. In a case where P2<−31, the variable P2 is set to −31, i.e. P2=−31.

At step 34, the analog correction circuit 23 determines whether the polarity of the variable P1 and the polarity of the variable P2 are the same. The analog correction circuit 23 proceeds to step S36, if step S34 is YES. The analog correction circuit 23 proceeds to step S35, if step S34 is NO. At step S35, the analog correction circuit 23 reverses the polarity reversal flag of the analog correction signal, and then proceeds to step S36. In a case where the polarity of the variable P1 and the polarity of the variable P2 are different, the analog signal which is generated at step S37 and the spread spectrum noise oscillate in the same phase. Therefore, it is necessary to reverse the phase of the analog signal in advance.

At step S36, the analog correction circuit 23 calculates the analog correction factor from the next variable P2. At first, the analog correction circuit 23 calculates the parameter att which expresses the attenuation amount from the next variable P2. The analog correction circuit 23 calculates the parameter att as att=31−P2, in a case where the next variable P2 is 0 or a positive value. The analog correction circuit 23 calculates the parameter att as att=31+P2, in a case where the P2 is a negative value. The analog correction circuit 23 rounds the parameter att off to the closest whole number. The analog correction circuit 23 calculates the analog correction factor Acf based on the parameter att by using a formula (7)

$$Acf=(1-att \div 31) \div 50 \qquad (7)$$

At step S37, the analog correction circuit 23 generates the analog correction signal Acs by multiplying the analog correction factor calculated at step S36, the plus sign or the minus sign of the polarity reversal flag ainv of the analog correction signal, and the triangle wave signal Tws which has been DA converted. The analog correction circuit 23 uses a formula (8) at step S37. The combiner 13 superimposes the analog correction signal which is generated by the analog correction circuit 23 onto the original image signal (analog data).

$$Acs=(+/-) \times Acf \times Tws \qquad (8)$$

At step S38, the noise detecting circuit 21 detects the noise amplitude of a signal which is generated by superimposing the analog correction signal that is generated by the analog correction circuit 23 onto the original image signal (analog data). The noise amplitude which is used in calculation at step S36 is referred to as "previous noise amplitude". The noise amplitude which is detected at step S38 is referred to as "current noise amplitude". At step S39, the analog correction circuit 23 determines whether the current noise amplitude becomes less than the previous noise amplitude. The analog correction circuit 23 proceeds to step S41, if step S39 is YES. The analog correction circuit 23 proceeds to step S40, if step S39 is NO. At step S40, the analog correction circuit 23 reverses the factor k, i.e. reverses the factor k from 1 to −1, or reverses the factor k from 1 to −1. After finishing step S40, the analog correction circuit 23 proceeds to step S41. A direction in which the next variable P2 varies with regard to the current variable P1 is reversed by the reversal of the factor k, according to the formula (6).

At step S41, the analog correction circuit 23 determines which analog correction method is designated. The analog correction circuit 23 proceeds to step S42, if method 1 is designated. The analog correction circuit 23 proceeds to step S44, if method 2 is designated. At step S42, the analog correction circuit 23 determines whether the number of times n1, which indicates number of times the loop from steps S33 to S43 is executed, reaches designated number of times which is set in advance. The analog correction circuit 23 proceeds to step S43, if step S42 is NO. The analog correction circuit 23 proceeds to step S45, if step S42 is YES. At step S43, the analog correction circuit 23 increments the number of times n1 which indicates number of times the loop from steps S33 to S43 is executed, and makes the next variable P2 into the current variable P1. Thus, the next variable P2 becomes the current variable P1. Then the analog correction circuit 23 returns the flow to step S33. At step S44, the analog correction circuit 23 executes the analog correction process of method 2 which will be described below with reference to FIG. 9, and then proceeds to step S45. At step S45, the analog correction circuit 23 stores the conclusive analog correction factor and the current noise amplitude into a resistor in the analog correction circuit 23. The conclusive analog correction factor is the analog correction factor which is conclusively obtained from the analog correction process of method 2. Then, the analog correction circuit 23 returns to the noise filtering process shown in FIG. 7.

Figure 9:
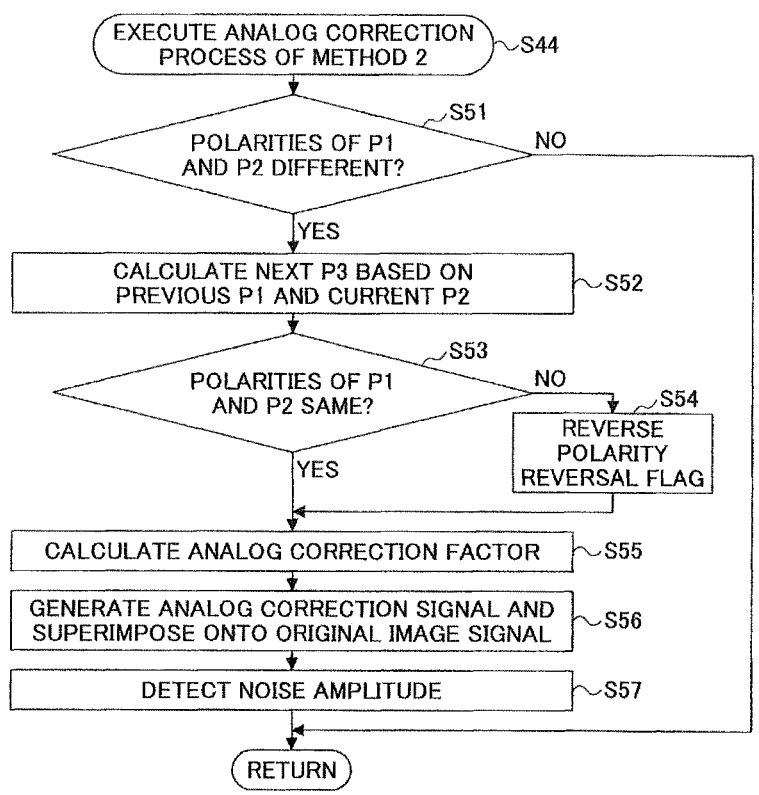
FIG. 9 is a flowchart showing a subroutine of the analog correction process of method 2 at step S44 shown in FIG. 8.

FIG. 9 is a flowchart showing a subroutine of the analog correction process of method 2 at step S44 shown in FIG. 8. The analog correction circuit 23 makes the current variable P1 into the previous variable, and makes the next variable P2 into the current variable. As described above, according to the analog correction process of method 2, the next variable is calculated from the previous variable P1, the current variable P2, the previous noise amplitude and the current noise amplitude. At step S51, the analog correction circuit 23 determines whether the previous variable P1 and the current variable P2 are different from each other. The analog correction circuit 23 proceeds to step S52, if step S51 is YES. The analog correction circuit 23 returns to the analog correction process shown in FIG. 8, if step S51 is NO.

At step S52, the analog correction circuit 23 calculates the next variable P3 based on the previous variable P1 and the current variable P2 by using a formula (9), where Nap is the previous noise amplitude and Nac is the current noise amplitude.

$$P3=(P2 \times Nap - P1 \times Nac) \div (Nap - Nac) \qquad (9)$$

In a case where P3>31, the variable P3 is set to 31, i.e. P3=31. In a case where P3<−31, the variable P3 is set to −31, i.e. P3=−31. In a case where the previous noise amplitude and the current noise amplitude are the same, the variable P3 is set to P2, i.e. P3=P2.

At step S53, the analog correction circuit 23 determines whether the polarity of the current variable P2 and the polarity of the next variable P3 are the same. The analog correction circuit 23 proceeds to step S55, if step S53 is YES. The analog correction circuit 23 proceeds to step S54, if step S53 is NO. At step S54, the analog correction circuit 23 reverses the polarity reversal flag of the analog correction signal, and then proceeds to step S55. At step S55, the analog correction circuit 23 calculates the analog correction factor from the next variable P3. The process at step S55 is executed in a similar manner to the process at step S36 except for using the next variable P3 instead of the next variable P2 at step S36. At step S56, the analog correction circuit 23 generates the analog correction signal Acs by multiplying the analog correction factor calculated at step S55, the plus sign or the minus sign of the polarity reversal flag ainv of the analog correction signal, and the triangle wave signal Tws which has been DA converted. The process at step S56 is executed in a similar manner to the process at step S37. The combiner 13 superimposes the analog correction signal which is generated by the analog correction circuit 23 onto the original image signal (analog data). Finally, at step S57, the noise detecting circuit 21 detects the noise amplitude of a signal which is generated by superimposing the analog correction signal that is generated by the analog correction circuit 23 onto the original image signal (analog data). The noise detecting circuit 21 detects the noise amplitude as the current noise amplitude at step S57. Then the analog correction circuit 23 returns to the analog correction process shown in FIG. 8.

Figure 10:
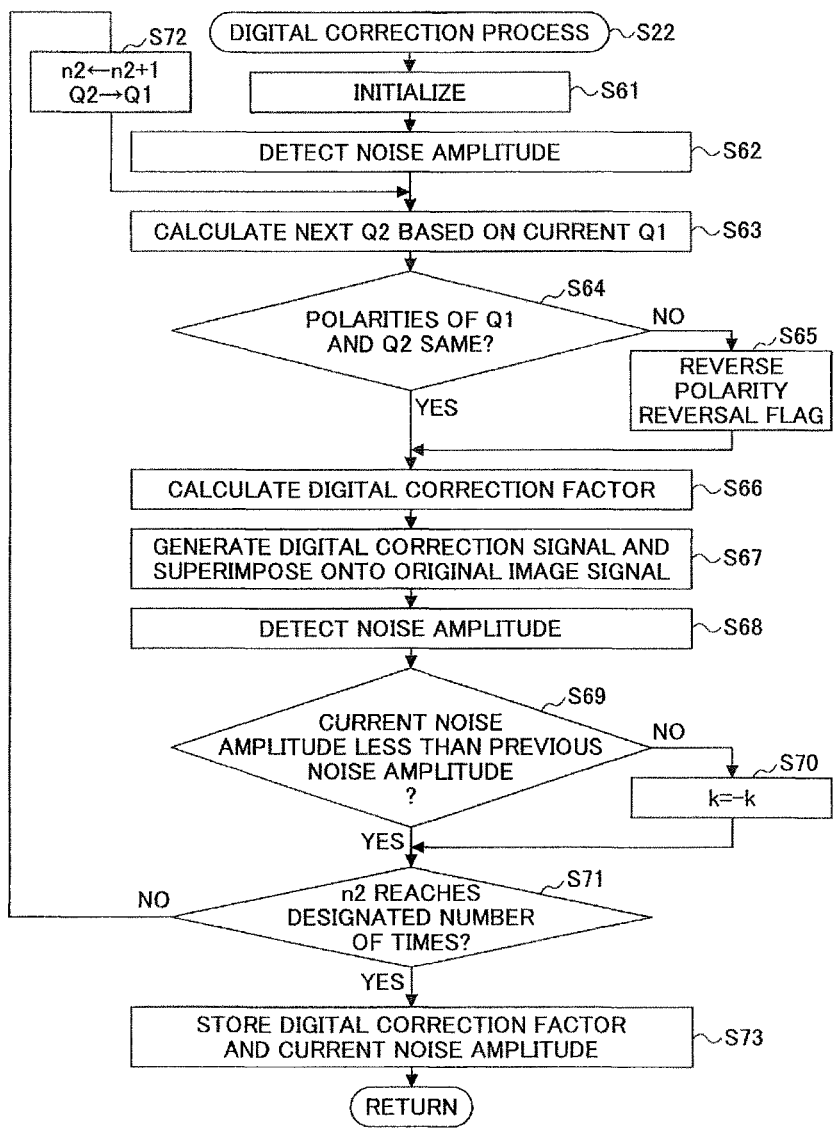
FIG. 10 is a flowchart showing a subroutine of the digital correction process at step S22 shown in FIG. 7.

FIG. 10 is a flowchart showing a subroutine of the digital correction process at step S22 shown in FIG. 7. The internal control circuit 20 causes the digital correction circuit 22 to execute the digital correction process at step S22. In the digital correction process, the digital correction circuit 22 calculates the digital correction factor based on the noise amplitude signal, and determines a polarity reversal flag of the digital correction signal. The digital correction circuit 22 generates the digital correction signal by multiplying the digital correction factor, the plus sign or the minus sign of the polarity reversal flag of the digital correction signal, and the triangle wave signal (digital data). In the digital correction signal, the next variable is calculated based on the current variable and the current noise amplitude.

At step S61, the digital correction circuit initialize parameters that are used in steps described later. The parameters include items as described below, for example, but are not limited to these items.

21. Setting a parameter dcoe to an arbitrary integer among integers from 0 to 1023. The parameter dcoe expresses the digital correction factor. Value of the parameter dcoe is transmitted to the digital correction circuit 22 from the external control circuit 6 via the internal control circuit 20 based on the condition which is determined by an entry of a user or the like.

22. Setting the polarity reversal flag dinv of the digital correction signal to 0. The polarity reversal flag dinv takes value of 1 or 0.

23. Initializing variables Q1 and Q2 that are used in midflow of calculation of the digital correction process. The current variable Q1 is set to a value which is calculated by dcoe×4, i.e. Q1=dcoe×4.

24. Setting a factor k to 1. The factor k determines an increase amount or a decrease amount of the variables. The factor k takes value of 1 or −1, i.e. k=1 or k=−1.

25. Setting a parameter fb which determines feed back amount of the noise amplitude.

26. Initializing a number of times n2 to 0. The number of times n2 indicates number of times the loop from steps S63 to S72 is executed.

The parameter fb is calculated by a formula (10), where a parameter trk is determined in advance. The parameter trk takes an integer value among integers from 0 to 3.

$$fb=(trk\times 4+1)\div 32 \quad (10)$$

The parameter fb determines a feed back amount of the noise amplitude. The value of the parameter trk may be the same as the parameter trk which is used in the analog correction process. The value of the parameter trk is transmitted to the digital correction circuit 22 from the external control circuit 6 via the internal control circuit 20.

At step S62, the noise detecting circuit 21 detects the noise amplitude of the spread spectrum noise. The detection of the noise amplitude is performed in a similar manner to the noise detection at step S13. At step S63, the digital correction circuit 22 calculates the next variable Q2 based on the current variable Q1 by using the formula (11), where Ac is the current noise amplitude.

$$Q2=Q1-k\times fb\times Ac\div Dg \quad (11)$$

As described above, Dg is a gain of the digital amplifier 17 and is calculated by a formula (4), where gain code D is a gain code of the digital amplifier 17.

$$Dg=\text{gain code } D \div 4096 \quad (4)$$

At step 64, the digital correction circuit 22 determines whether the polarity of the variable Q1 and the polarity of the variable Q2 are the same. The digital correction circuit 22 proceeds to step S66, if step S64 is YES. The digital correction circuit 22 proceeds to step S65, if step S64 is NO. At step S65, the digital correction circuit 22 reverses the polarity reversal flag of the digital correction signal, and then proceeds to step S66.

At step S66, the digital correction circuit 22 calculates the parameter dcoe which expresses the digital correction factor from the next variable Q2. The digital correction circuit 22 calculates the parameter dcoe as dcoe=Q2÷4, in a case where the next variable Q2 is 0 or a positive value. The digital correction circuit 22 calculates the parameter dcoe as dcoe=−Q2÷4, in a case where the Q2 is a negative value. The digital correction circuit 22 rounds the parameter dcoe off to the closest whole number.

At step S67, the digital correction circuit 22 generates the digital correction signal Dcs by multiplying the digital correction factor calculated at step S66, the plus sign or the minus sign of the polarity reversal flag dine of the digital correction signal, and the triangle wave signal Twsd (digital data). The digital correction circuit 22 uses formulae (12) and (13) at step S67. The combiner 16 superimposes the digital correction signal which is generated by the digital correction circuit 22 onto the original image signal (digital data).

In a case where the polarity reversal flag dinv of the digital correction signal is 0, i.e. dinv=0, the digital correction circuit 22 uses formula (12).

$$Dcs=Twsd\times dcoe \div 255 \quad (12)$$

In a case where the polarity reversal flag dinv of the digital correction signal is 1, i.e. dinv=1, the digital correction circuit 22 uses formula (13).

$$Dcs=(-Twsd-1)\times dcoe \div 255 \quad (13)$$

The calculation results of the formulae (12) and (13) are output as a complement number of two.

At step S68, the noise detecting circuit 21 detects the noise amplitude of a signal which is generated by superimposing the digital correction signal that is generated by the digital correction circuit 22 onto the original image signal (digital data). The signal is generated by and output from the combiner 16. The noise amplitude which is used in calculation at step S66 is referred to as "previous noise amplitude". The noise amplitude which is detected at step S68 is referred to as "current noise amplitude". At step S69, the digital correction circuit 22 determines whether the current noise amplitude becomes less than the previous noise amplitude. The digital correction circuit 22 proceeds to step S71, if step S69 is YES. The digital correction circuit 22 proceeds to step S70, if step S69 is NO. At step S70, the digital correction circuit 22 reverses the factor k, i.e. reverses the factor k from 1 to −1, or reverses the factor k from 1 to −1. After finishing step S70, the digital correction circuit 22 proceeds to step S71. A direction in which the next variable Q2 varies with regard to the current variable Q1 is reversed by the reversal of the factor k, according to the formula (11).

At step S71, the digital correction circuit 22 determines whether the number of times n2, which indicates number of times the loop from steps S63 to S72 is executed, reaches designated number of times which is set in advance. The digital correction circuit 22 proceeds to step S73, if step S71 is YES. The digital correction circuit 22 proceeds to step S72, if step S71 is NO. At step S72, the digital correction circuit 22 increments the number of times n2 which indicates number of times the loop from steps S63 to S72 is executed, and makes the next variable Q2 into the current variable Q1. Thus, the next variable Q2 becomes the current variable Q1. Then the digital correction circuit 22 returns the flow to step S63. At step S73, the digital correction circuit 22 stores the conclusive digital correction factor and the current noise amplitude into a resistor in the digital correction circuit 22. The conclusive digital correction factor is conclusively obtained from the digital correction process. Then, the digital correction circuit 22 returns to the noise filtering process shown in FIG. 7.

Herein, at step S5 shown in FIG. 6, the internal control circuit 20 filters out the noise based on the previous analog correction factor which is stored at step S45 and the previous digital correction factor which is stored at step S73. At step S5, the internal control circuit 20 may filter out the noise based on a designated analog correction factor and a designated digital correction factor instead of using the previous analog correction factor and the previous digital correction factor.

The original image signal, the analog correction signal and the digital correction signal are synchronized by using a synchronization signal of the timing generating circuit 29.

The processes as shown in FIGS. 7 to 10 can be executed for R (Red) channel, G (Green) channel and B (Blue) channel independently.

Although the embodiment which utilizes the triangle wave signal is described above, the present embodiment is not limited to the embodiment described above. For example, a modulation signal which has a shape besides the triangle wave shape can be used for performing the spread spectrum modulation similar to the embodiment as described above.

The analog correction circuit 23 filters out the noise at the input side of the analog amplifier 14 and the AD converter 15. On the contrary, the digital correction circuit 22 filters out the noise in the digital circuit which is disposed at the output side of the AD converter 15. As is understood from the FIG. 7, the analog correction process which calculates the analog correction factor and the digital correction process which calculates the digital correction factor are not executed at the same time. It is effective to execute the digital correction process after executing the analog correction process in that the analog correction signal is superimposed onto the original image signal (analog data). In the analog correction process, it is possible to maintain a noise filtering effect even though the gain of the analog amplifier 14 is changed. The image signal is input into the analog correction circuit 14 and the AD converter 15 in a state where the spread spectrum noise is relatively low. Although an attenuation rate of the analog correction circuit 23 is relatively rough, the digital correction circuit 22 can provide an attenuation rate with high accuracy and stability. It is necessary to filter out the noise at the input side of the digital amplifier 17, because the digital amplifier 17 is important in the operation of the signal processing circuit 4. At step S6 shown in FIG. 6, the analog correction signal is superimposed onto the original image signal (analog data), and the digital correction signal is superimposed onto the original image signal (digital data) at the same time.

The conventional image signal processing apparatus has problems in that it is not possible to adjust the phase of the loop filter signal and the loop filter signal is susceptible to an external noise. These problems are caused because the loop filter signal which is used for generating the correction signal and is supplied from outside the signal processing circuit 4 (IC) as the analog data.

On the contrary, according to the present embodiment, the signal processing circuit 4 is closed as the IC which includes the clock circuit 24 and it is not necessary to input the clock signal or the like as external signals. The phase of the triangle signal is adjustable. Since the triangle wave signal generating circuit 36 is comprised of logic circuits, the triangle wave signal generating circuit 36 is susceptible to the noise. The triangle wave signal is supplied as the digital data from the clock circuit 24 in the signal processing circuit 4 (IC). The image signal processing apparatus according to the present embodiment is less susceptible to the external noise than the conventional image signal processing apparatus. Further, the noise amplitude signal which is detected by the noise detecting circuit 21 is stable, since the noise amplitude signal is transmitted as the digital data to the analog correction circuit 23 and the digital correction circuit 22. Accordingly, according to the present embodiment of the present invention, it becomes possible to filter out the noise with high accuracy.

The present invention is not limited to the specifically disclosed embodiments, and variations and modifications may be made without departing from the scope of the present invention.

The present application is based on Japanese Priority Application No. 2010-206946 filed on Sep. 15, 2010 with the Japanese Patent Office, the entire contents of which are hereby incorporated herein by reference.

INDUSTRIAL APPLICABILITY

The image signal processing apparatus of the present embodiment can reduce the peak level of the EMI which has the peak at the specific frequency by dispersing the energy of the EMI in a similar manner to the conventional image scanning apparatus which includes the SSCG. The image scanning apparatus of the present embodiment can further filter out the triangle wave noise which is in-phase or reverse-phase with the image signal (the spread spectrum noise) and has the same cycle as that of the modulation signal of the spread spectrum.

The invention claimed is:
1. An image signal processing apparatus comprising:
a clock generator configured to generate a clock signal which has been subjected to spread spectrum modulation by using a digital modulation signal and to supply the clock signal to a photoelectric conversion element;
an AD converter configured to perform AD conversion on an image signal which is obtained by the photoelectric conversion element;
a noise detector configured to detect and calculate a noise amplitude of a noise signal which is caused by the spread spectrum modulation of the clock signal and is included in the image signal that has been AD converted; and
a correction circuit configured to calculate a correction factor based on the noise amplitude detected by the noise detector, to generate a correction signal by multiplying the digital modulation signal by the correction factor generated based on the detected noise amplitude, and to superimpose the correction signal onto the image signal at an input side or an output side of the AD converter,
wherein the noise detector detects the noise amplitude by detecting a voltage difference between a peak voltage and a bottom voltage, and wherein the peak voltage is given by a mean voltage of a designated period of time before and after a peak of the image signal, and the bottom voltage is given by a mean voltage of a designated period of time before and after a bottom of the image signal.
2. The image signal processing apparatus as claimed in claim 1, wherein the image signal processing apparatus is comprised of an integrated circuit.
3. An image signal processing apparatus comprising:
a clock generator configured to generate a clock signal which has been subjected to spread spectrum modula- tion by using a digital modulation signal and to supply the clock signal to a photoelectric conversion element;

an AD converter configured to perform AD conversion on an image signal which is obtained by the photoelectric conversion element;

a noise detector configured to detect a noise amplitude of a noise signal which is caused by the spread spectrum modulation of the clock signal and is included in the image signal that has been AD converted; and a correction circuit configured to calculate a correction factor based on the noise amplitude, to generate a correction signal by multiplying the digital modulation signal by the correction factor, and to superimpose the correction signal onto the image signal at an input side or an output side of the AD converter, wherein the correction factor includes a first correction factor which is an analog value, and wherein the correction circuit includes:
- a DA converter configured to perform DA conversion on the digital modulation signal and to output an analog modulation signal; and
- a first correction circuit configured to calculate the first correction factor based on the noise amplitude, to generate a first correction signal by multiplying the analog modulation signal by the first correction factor, and to superimpose the first correction signal onto the image signal at the input side of the AD converter, and wherein the first correction circuit uses a first variable which is used for calculating the first correction factor, updates the first variable by calculating the next first variable based on the current first variable and the current noise amplitude, and calculates the first correction factor based on the next first variable.

4. The image signal processing apparatus as claimed in claim 3, further comprising:
a first delay element configured to compensate for delay time which occurs in the photoelectric conversion element, wherein the first delay element is disposed between the clock generator and the DA converter.

5. The image signal processing apparatus as claimed in claim 3, wherein the correction factor includes a second correction factor which is a digital value, and wherein the correction circuit includes:
a second correction circuit configured to calculate the second correction factor based on the noise amplitude, to generate a second correction signal by multiplying the digital modulation signal by the second correction factor, and to superimpose the second correction signal onto the image signal at the output side of the AD converter, wherein the second correction circuit uses a second variable which is used for calculating the second correction factor, updates the second variable by calculating the next second variable based on the current second variable and the current noise amplitude, and calculates the second correction factor based on the next second variable.

6. The image signal processing apparatus as claimed in claim 5, further comprising:
a second delay element configured to compensate for delay time which occurs between the photoelectric conversion element and the AD converter, wherein the second delay element is disposed between the clock generator and the second correction circuit.

7. The image signal processing apparatus as claimed in claim 3, wherein the image signal processing apparatus is comprised of an integrated circuit.

8. An image scanning apparatus comprising: the image signal processing apparatus as claimed in claim 1.

9. An image scanning apparatus comprising:
the image signal processing apparatus as claimed in claim 3.

10. A method for processing an image signal comprising:
a step for generating a clock signal which has been subjected to spread spectrum modulation by using a digital modulation signal and supplying the clock signal to a photoelectric conversion element;
a step for performing AD conversion on an image signal which is obtained by the photoelectric conversion element;
a noise detection step for detecting a noise amplitude of a noise signal which is caused by the spread spectrum modulation of the clock signal and is included in the image signal that has been AD converted; and
a correction step for calculating a correction factor based on the noise amplitude detected in the noise detection step, generating a correction signal by multiplying the digital modulation signal by the correction factor generated based on the detected noise amplitude, and superimposing the correction signal onto the image signal at an input side or an output side of the AD converter,
wherein the correction factor includes a first correction factor which is an analog value, and
wherein the correction step includes:
a step for performing DA conversion on the digital modulation signal and outputting an analog modulation signal; and
a first correction step for calculating the first correction factor based on the noise amplitude, generating a first correction signal by multiplying the analog modulation signal by the first correction factor, and superimposing the first correction signal onto the image signal at the input side of the AD converter,
wherein the first correction step includes;
a step for using a first variable which is used for calculating the first correction factor, updating the first variable by calculating the next first variable based on the current first variable and the current noise amplitude, and calculating the first correction factor based on the next first variable.

11. The method for processing an image signal as claimed in claim 10, further comprising:
a step for delaying the digital modulation signal in order to compensate for delay time which occurs in the photoelectric conversion element before the step for performing AD conversion on the image signal.

12. The method for processing an image signal as claimed in claim 10, wherein the correction factor includes a second correction factor which is a digital value, and
wherein the correction step includes:
a second correction step for calculating the second correction factor based on the noise amplitude, generating a second correction signal by multiplying the digital modulation signal by the second correction factor, and superimposing the second correction signal onto the image signal at the output side of the AD converter,
wherein the second correction step includes:
a step for using a second variable which is used for calculating the second correction factor, updating the second variable by calculating the next second variable based on the current second variable and the current noise amplitude, and calculating the second correction factor based on the next second variable.

13. The method for processing an image signal as claimed in claim 12, further comprising:
a step for delaying the digital modulation signal in order to compensate for delay time which occurs between the photoelectric conversion element and the AD converter before the second correction step.

14. The image signal processing apparatus as claimed in claim 10, wherein the noise detection step includes:
a step for detecting the noise amplitude by detecting a voltage difference between a peak voltage and a bottom voltage, and wherein the peak voltage is given by a mean voltage of a designated period of time before and after a peak of the image signal, and the bottom voltage is given by a mean voltage of a designated period of time before and after a bottom of the image signal.

* * * * *